United States Patent
Choi et al.

(10) Patent No.: US 7,816,873 B2
(45) Date of Patent: Oct. 19, 2010

(54) LINEAR COMPRESSOR

(75) Inventors: Bong-Jun Choi, Changwon-Shi (KR); Chang-Yong Jang, Gwangju (KR); Man-Seok Cho, Geoje-Shi (KR); Shin-Hyun Park, Busan (KR); Hyun Kim, Changwon-Shi (KR); Jong-Min Shin, Busan (KR); Young-Hoan Jeon, Changwon-Shi (KR); Chul-Gi Roh, Changwon-Shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/660,735

(22) PCT Filed: Aug. 30, 2004

(86) PCT No.: PCT/KR2004/002178
§ 371 (c)(1),
(2), (4) Date: Oct. 11, 2007

(87) PCT Pub. No.: WO2006/025618
PCT Pub. Date: Mar. 9, 2006

(65) Prior Publication Data
US 2008/0095641 A1  Apr. 24, 2008

(51) Int. Cl.
*H02K 33/00* (2006.01)
(52) U.S. Cl. .................... 318/119; 318/127; 318/128
(58) Field of Classification Search ............... 318/119, 318/127, 128, 135, 126; 324/76.52
See application file for complete search history.

(56) References Cited
U.S. PATENT DOCUMENTS
5,980,211 A * 11/1999 Tojo et al. .................... 417/45

| | | | |
|---|---|---|---|
| 2002/0093327 A1* | 7/2002 | Yoo et al. | 324/76.52 |
| 2003/0026703 A1 | 2/2003 | Yoo et al. | |
| 2004/0005222 A1 | 1/2004 | Yoshida et al. | |
| 2004/0071556 A1 | 4/2004 | Sung et al. | |
| 2005/0031470 A1* | 2/2005 | Lee | 417/416 |
| 2007/0159128 A1* | 7/2007 | Dainez et al. | 318/687 |

FOREIGN PATENT DOCUMENTS

| | | |
|---|---|---|
| JP | 11-351143 A | 12/1999 |
| JP | 2002/044977 A | 2/2002 |
| JP | 2002-354864 A | 12/2002 |
| JP | 2003-339188 A | 11/2003 |
| JP | 2004-138051 A | 5/2004 |
| WO | WO-2004/063569 A1 | 7/2004 |

* cited by examiner

Primary Examiner—Karen Masih
(74) Attorney, Agent, or Firm—Birch, Stewart, Kolasch & Birch, LLP (57) ABSTRACT

The present invention discloses an apparatus and method for controlling a linear compressor which can actively handle load and efficiently perform an operation, by synchronizing an operation frequency with a natural frequency of a movable member varied by the load. The apparatus for controlling the linear compressor includes a counter electromotive force phase detecting unit for detecting a phase of a counter electromotive force from a voltage command value of the linear compressor and an input current, a current phase detecting unit for detecting a phase of the input current, a frequency generating unit for comparing the phase of the counter electromotive force with the phase of the input current, and generating a frequency change value, a control unit for correcting the voltage command value according to the frequency change value, and an inverter unit for receiving a direct current voltage, generating a sine wave voltage according to the corrected voltage command value, and applying the sine wave voltage to the linear compressor.

8 Claims, 5 Drawing Sheets

LINEAR COMPRESSOR

TECHNICAL FIELD

The present invention relates to an apparatus and method for controlling a linear compressor which can actively handle load and efficiently perform an operation, by synchronizing an operation frequency with a natural frequency of a movable member varied by the load.

BACKGROUND ART

In general, a compressor that is a mechanical apparatus for increasing a pressure, by receiving power from a power unit system such as an electric motor or turbine and compressing air, refrigerants or other various operation gases has been widely used for home appliances such as a refrigerator and an air conditioner or in the whole industrial fields.

The compressors are roughly divided into a reciprocating compressor having a compression space through which operation gases are sucked or discharged between a piston and a cylinder, so that the piston can be linearly reciprocated inside the cylinder to compress refrigerants, a rotary compressor having a compression space through which operation gases are sucked or discharged between an eccentrically-rotated roller and a cylinder, so that the roller can be eccentrically rotated on the inner walls of the cylinder to compress refrigerants, and a scroll compressor having a compression space through which operation gases are sucked or discharged between an orbiting scroll and a fixed scroll, so that the orbiting scroll can be rotated with the fixed scroll to compress refrigerants.

Recently, among the reciprocating compressors, a linear compressor has been mass-produced because it has high compression efficiency and simple structure by removing mechanical loss by motion conversion by directly connecting a piston to a driving motor performing linear reciprocation.

Generally, the linear compressor which sucks, compresses and discharges refrigerants by using a linear driving force of the motor includes a compression unit consisting of a cylinder and a piston for compressing refrigerant gases, and a driving unit consisting of a linear motor for supplying a driving force to the compression unit.

In detail, in the linear compressor, the cylinder is fixedly installed in a closed vessel, and the piston is installed in the cylinder to perform linear reciprocation. When the piston is linearly reciprocated inside the cylinder, refrigerants are sucked into a compression space in the cylinder, compressed and discharged. A suction valve assembly and a discharge valve assembly are installed in the compression space, for controlling suction and discharge of the refrigerants according to the inside pressure of the compression space.

In addition, the linear motor for generating a linear motion force to the piston is installed to be connected to the piston. An inner stator and an outer stator formed by stacking a plurality of laminations at the periphery of the cylinder in the circumferential direction are installed on the linear motor with a predetermined gap. A coil is coiled inside the inner stator or the outer stator, and a permanent magnet is installed at the gap between the inner stator and the outer stator to be connected to the piston.

Here, the permanent magnet is installed to be movable in the motion direction of the piston, and linearly reciprocated in the motion direction of the piston by an electromagnetic force generated when a current flows through the coil. Normally, the linear motor is operated at a constant operation frequency $f_c$, and the piston is linearly reciprocated by a predetermined stroke S.

On the other hand, various springs are installed to elastically support the piston in the motion direction even though the piston is linearly reciprocated by the linear motor. In detail, a coil spring which is a kind of mechanical spring is installed to be elastically supported by the closed vessel and the cylinder in the motion direction of the piston. Also, the refrigerants sucked into the compression space serve as a gas spring.

The coil spring has a constant mechanical spring constant $K_m$, and the gas spring has a gas spring constant $K_g$ varied by load. A natural frequency $f_n$ of the piston is calculated in consideration of the mechanical spring constant $K_m$ and the gas spring constant $K_g$.

The thusly-calculated natural frequency $f_n$ of the piston determines the operation frequency $f_c$ of the linear motor. The linear motor improves efficiency by equalizing its operation frequency $f_c$ to the natural frequency $f_n$ of the piston, namely, operating in the resonance state.

Accordingly, in the linear compressor, when a current is applied to the linear motor, the current flows through the coil to generate an electromagnetic force by interactions with the outer stator and the inner stator, and the permanent magnet and the piston connected to the permanent magnet are linearly reciprocated by the electromagnetic force.

Here, the linear motor is operated at the constant operation frequency $f_c$. The operation frequency $f_c$ of the linear motor is equalized to the natural frequency $f_n$ of the spring, so that the linear motor can be operated in the resonance state to maximize efficiency.

As described above, when the piston is linearly reciprocated inside the cylinder, the inside pressure of the compression space is changed. The refrigerants are sucked into the compression space, compressed and discharged according to changes of the inside pressure of the compression space.

The linear compressor is formed to be operated at the operation frequency $f_c$ identical to the natural frequency $f_n$ of the piston calculated by the mechanical spring constant $K_m$ of the coil spring and the gas spring constant $K_g$ of the gas spring under the load considered in the linear motor at the time of design. Therefore, the linear motor is operated in the resonance state merely under the load considered on design, to improve efficiency.

However, since the actual load of the linear compressor is varied, the gas spring constant $K_g$ of the gas spring and the natural frequency $f_n$ of the piston calculated by the gas spring constant $K_g$ are changed.

Figure 1A:
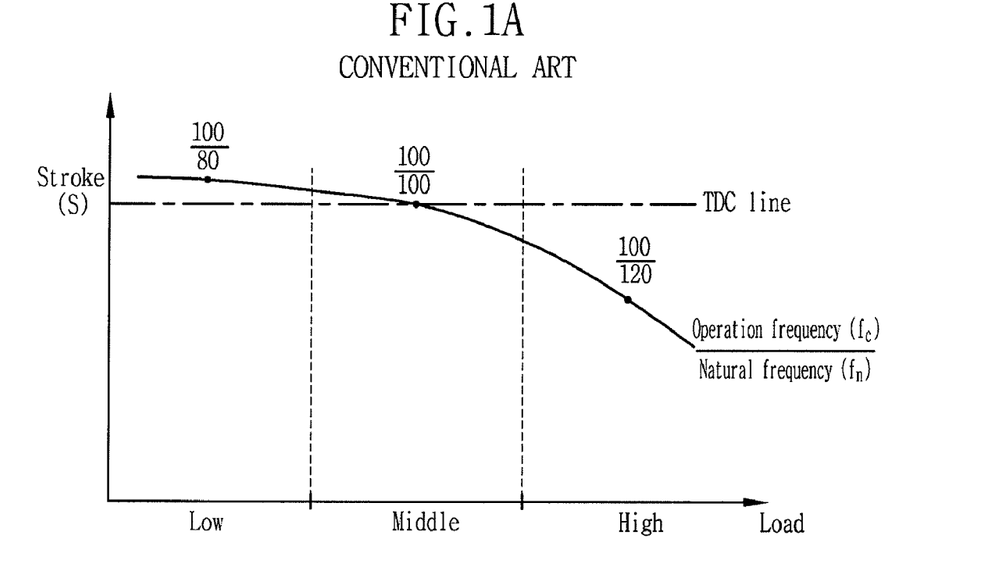
FIG. 1A is a graph showing a stroke by load in a conventional linear compressor.

In detail, as illustrated in FIG. 1A, the operation frequency $f_c$ of the linear motor is determined to be identical to the natural frequency $f_n$ of the piston in a middle load area at the time of design. Even if the load is varied, the linear motor is operated at the constant operation frequency $f_c$. But, as the load increases, the natural frequency $f_n$ of the piston increases.

$$f_n = \frac{1}{2\pi}\sqrt{\frac{K_m + K_g}{M}} \qquad \text{Formula 1}$$

Here, $f_n$ represents the natural frequency of the piston, $K_m$ and $K_g$ represent the mechanical spring constant and the gas spring constant, respectively, and M represents a mass of the piston.

Generally, since the gas spring constant $K_g$ has a small ratio in the total spring constant $K_t$, the gas spring constant $K_g$ is ignored or set to be a constant value. The mass M of the piston and the mechanical spring constant $K_m$ are also set to be constant values. Therefore, the natural frequency $f_n$ of the piston is calculated as a constant value by the above Formula 1.

However, the more the actual load increases, the more the pressure and temperature of the refrigerants in the restricted space increase. Accordingly, an elastic force of the gas spring itself increases, to increase the gas spring constant $K_g$. Also, the natural frequency $f_n$ of the piston calculated in proportion to the gas spring constant $K_g$ increases.

Figure 1B:
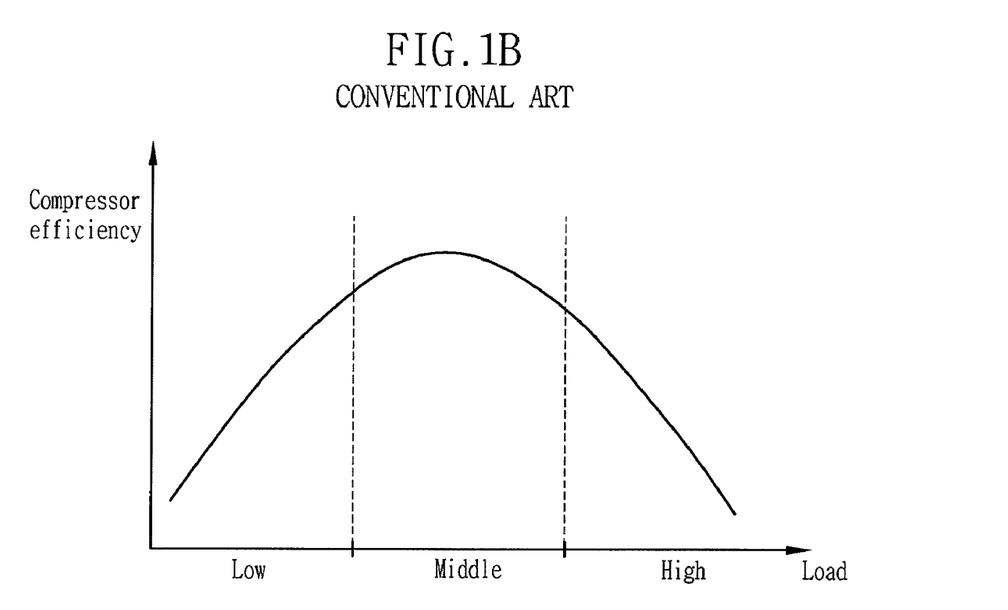
FIG. 1B is a graph showing efficiency by the load in the conventional linear compressor.

Referring to FIGS. 1A and 1B, the operation frequency $f_c$ of the linear motor and the natural frequency $f_n$ of the piston are identical in the middle load area, so that the piston can be operated to reach a top dead center (TDC), thereby stably performing compression. In addition, the linear motor is operated in the resonance state, to maximize efficiency of the linear compressor.

However, the natural frequency $f_n$ of the piston gets smaller than the operation frequency $f_c$ of the linear motor in a low load area, and thus the piston is transferred over the TDC, to apply an excessive compression force. Moreover, the piston and the cylinder are abraded by friction. Since the linear motor is not operated in the resonance state, efficiency of the linear compressor is reduced.

In addition, the natural frequency $f_n$ of the piston becomes larger than the operation frequency $f_c$ of the linear motor in a high load area, and thus the piston does not reach the TDC, to reduce the compression force. The linear motor is not operated in the resonance state, thereby decreasing efficiency of the linear compressor.

As a result, in the conventional linear compressor, when the load is varied, the natural frequency $f_n$ of the piston is varied, but the operation frequency $f_c$ of the linear motor is constant. Therefore, the linear motor is not operated in the resonance state, which results in low efficiency. Furthermore, the linear compressor cannot actively handle and rapidly overcome the load.

DISCLOSURE OF THE INVENTION

The present invention is achieved to solve the above problems. An object of the present invention is to provide an apparatus and method for controlling a linear compressor which enable the linear compressor to perform suction and compression in the resonance state, by synchronizing an operation frequency of a linear motor with a mechanical natural frequency.

Another object of the present invention is to provide an apparatus and method for controlling a linear compressor which can overcome structural errors of the linear compressor, by estimating a mechanical natural frequency varied by load, and synchronizing an operation frequency with the mechanical natural frequency.

In order to achieve the above-described objects of the invention, there is provided an apparatus for controlling a linear compressor, comprising: a counter electromotive force phase detecting unit for detecting a phase of a counter electromotive force E from a voltage command value V* of the linear compressor and an input current i, a current phase detecting unit for detecting a phase of the input current i, a frequency generating unit for comparing the phase of the counter electromotive force E with the phase of the input current i, and generating a frequency change value, a control unit for correcting the voltage command value V* according to the frequency change value, and an inverter unit for receiving a direct current voltage, generating a sine wave voltage according to the corrected voltage command value V*, and applying the sine wave voltage to the linear compressor.

Preferably, the counter electromotive force phase detecting unit detects the phase by operating the counter electromotive force E by the following Formula:

$$E = V^* - Ri - L\frac{di}{dt}$$

(R: Winding Resistance, L: Inductance)

Preferably, the frequency generating unit generates the frequency change value so that the phase of the counter electromotive force E and the phase of the input current i can be inphase.

Preferably, the control unit transmits the corrected voltage command value V* to the inverter unit in the form of a predetermined inverter control signal.

According to another aspect of the present invention, a method for controlling a linear compressor includes the steps of: detecting a phase of a counter electromotive force E from a voltage command value V* of the linear compressor and an input current i, detecting a phase of the input current i, comparing the phase of the counter electromotive force E with the phase of the input current i, and generating a frequency change value, correcting the voltage command value V* according to the frequency change value, and receiving a direct current voltage, and generating a sine wave voltage according to the corrected voltage command value V*.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

A linear compressor in accordance with preferred embodiments of the present invention will now be described in detail with reference to the accompanying drawings.

Figure 2:
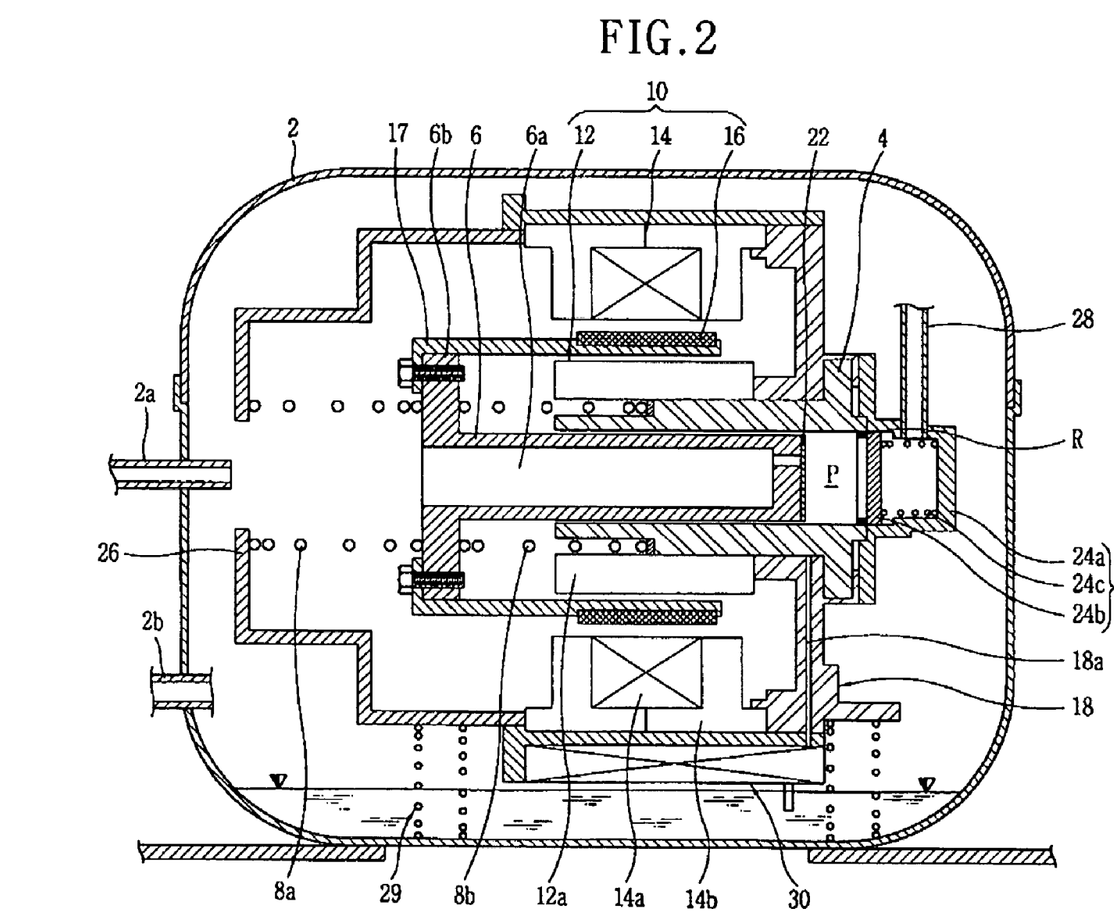
FIG. 2 is a cross-sectional view illustrating a linear compressor in accordance with the present invention.
Figure 3A:
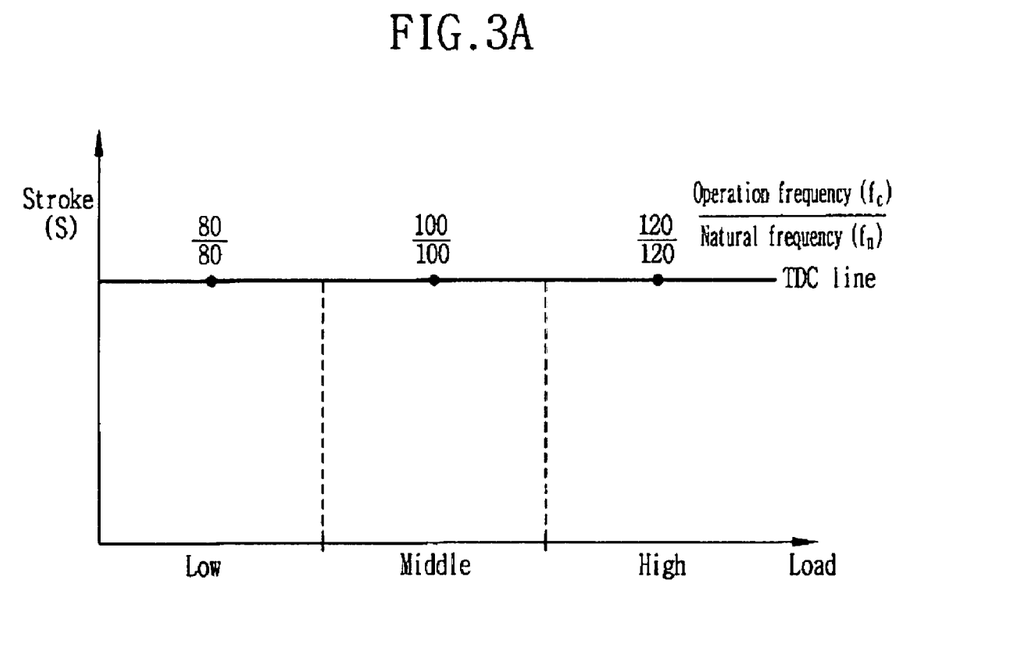
FIG. 3A is a graph showing a stroke by load in the linear compressor in accordance with the present invention.
Figure 3B:
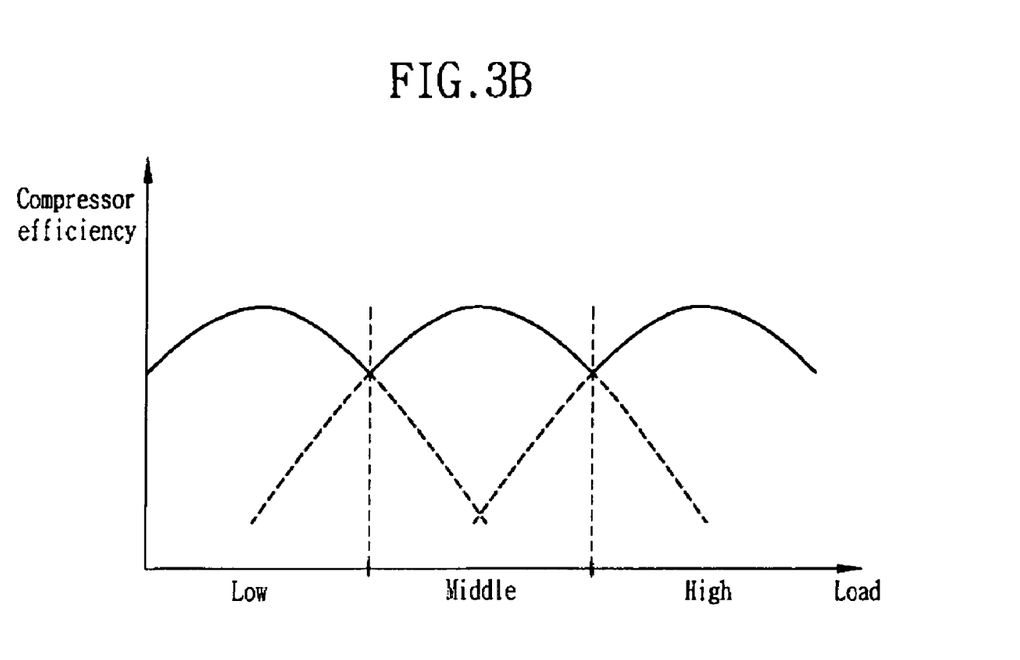
FIG. 3B is a graph showing efficiency by the load in the linear compressor in accordance with the present invention.

As shown in FIG. 2, in the linear compressor, an inlet tube 2a and an outlet tube 2b through which refrigerants are sucked and discharged are installed at one side of a closed vessel 2, a cylinder 4 is fixedly installed inside the closed vessel 2, a piston 6 is installed inside the cylinder 4 to be linearly reciprocated to compress the refrigerants sucked into a compression space P in the cylinder 4, and various springs are installed to be elastically supported in the motion direction of the piston 6. Here, the piston 6 is connected to a linear motor 10 for generating a linear reciprocation driving force. As depicted in FIGS. 3A and 3B, even if a natural frequency $f_n$ of the piston 6 is varied by load, the linear motor 10 controls its operation frequency $f_c$ to be synchronized with the natural frequency $f_n$ of the piston 6, so that the resonance operation can be performed in the whole load areas to improve compression efficiency.

In addition, a suction valve 22 is installed at one end of the piston 6 contacting the compression space P, and a discharge valve assembly 24 is installed atone end of the cylinder 4 contacting the compression space P. The suction valve 22 and the discharge valve assembly 24 are automatically controlled to be opened or closed according to the inside pressure of the compression space P, respectively.

The top and bottom shells of the closed vessel 2 are coupled to hermetically seal the closed vessel 2. The inlet tube 2a through which the refrigerants are sucked and the outlet tube 2b through which the refrigerants are discharged are installed at one side of the closed vessel 2. The piston 6 is installed inside the cylinder 4 to be elastically supported in the motion direction to perform the linear reciprocation. The linear motor 10 is connected to a frame 18 outside the cylinder 4. The cylinder 4, the piston 6 and the linear motor 10 compose an assembly. The assembly is installed on the inside bottom surface of the closed vessel 2 to be elastically supported by a support spring 29.

The inside bottom surface of the closed vessel 2 contains oil, an oil supply device 30 for pumping the oil is installed at the lower end of the assembly, and an oil supply tube 18a for supplying the oil between the piston 6 and the cylinder 4 is formed inside the frame 18 at the lower side of the assembly. Accordingly, the oil supply device 30 is operated by vibrations generated by the linear reciprocation of the piston 6, for pumping the oil, and the oil is supplied to the gap between the piston 6 and the cylinder 4 along the oil supply tube 18a, for cooling and lubrication.

The cylinder 4 is formed in a hollow shape so that the piston 6 can perform the linear reciprocation, and has the compression space P at its one side. Preferably, the cylinder 4 is installed on the same straight line with the inlet tube 2a in a state where one end of the cylinder 4 is adjacent to the inside portion of the inlet tube 2a.

The piston 6 is installed inside one end of the cylinder 4 adjacent to the inlet tube 2a to perform linear reciprocation, and the discharge valve assembly 24 is installed at one end of the cylinder 4 in the opposite direction to the inlet tube 2a.

Here, the discharge valve assembly 24 includes a discharge cover 24a for forming a predetermined discharge space at one end of the cylinder 4, a discharge valve 24b for opening or closing one end of the cylinder 4 near the compression space P, and a valve spring 24c which is a kind of coil spring for applying an elastic force between the discharge cover 24a and the discharge valve 24b in the axial direction. An O-ring R is inserted onto the inside circumferential surface of one end of the cylinder 4, so that the discharge valve 24a can be closely adhered to one end of the cylinder 4.

An indented loop pipe 28 is installed between one side of the discharge cover 24a and the outlet tube 2b, for guiding the compressed refrigerants to be externally discharged, and preventing vibrations generated by interactions of the cylinder 4, the piston 6 and the linear motor 10 from being applied to the whole closed vessel 2.

Therefore, when the piston 6 is linearly reciprocated inside the cylinder 4, if the pressure of the compression space P is over a predetermined discharge pressure, the valve spring 24c is compressed to open the discharge valve 24b, and the refrigerants are discharged from the compression space P, and then externally discharged along the loop pipe 28 and the outlet tube 2b.

A refrigerant passage 6a through which the refrigerants supplied from the inlet tube 2a flows is formed at the center of the piston 6. The linear motor 10 is directly connected to one end of the piston 6 adjacent to the inlet tube 2a by a connection member 17, and the suction valve 22 is installed at one end of the piston 6 in the opposite direction to the inlet tube 2a. The piston 6 is elastically supported in the motion direction by various springs.

The suction valve 22 is formed in a thin plate shape. The center of the suction valve 22 is partially cut to open or close the refrigerant passage 6a of the piston 6, and one side of the suction valve 22 is fixed to one end of the piston 6a by screws.

Accordingly, when the piston 6 is linearly reciprocated inside the cylinder 4, if the pressure of the compression space P is below a predetermined suction pressure lower than the discharge pressure, the suction valve 22 is opened so that the refrigerants can be sucked into the compression space P, and if the pressure of the compression space P is over the predetermined suction pressure, the refrigerants of the compression space P are compressed in the close state of the suction valve 22.

Especially, the piston 6 is installed to be elastically supported in the motion direction. In detail, a piston flange 6b protruded in the radial direction from one end of the piston 6 adjacent to the inlet tube 2a is elastically supported in the motion direction of the piston 6 by mechanical springs 8a and 8b such as coil springs. The refrigerants included in the compression space P in the opposite direction to the inlet tube 2a are operated as gas spring due to an elastic force, thereby elastically supporting the piston 6.

Here, the mechanical springs 8a and 8b have constant mechanical spring constants $K_m$ regardless of the load, and are preferably installed side by side with a support frame 26 fixed to the linear motor 10 and the cylinder 4 in the axial direction from the piston flange 6b. Also, preferably, the mechanical spring 8a supported by the support frame 26 and the mechanical spring 8a installed on the cylinder 4 have the same mechanical spring constant $K_m$.

However, the gas spring has a gas spring constant $K_g$ varied by the load. When an ambient temperature rises, the pressure of the refrigerants increases, and thus the elastic force of the gases in the compression space P increases. As a result, the more the load increases, the higher the gas spring constant $K_g$ of the gas spring is.

While the mechanical spring constant $K_m$ is constant, the gas spring constant $K_g$ is varied by the load. Therefore, the total spring constant is also varied by the load, and the natural frequency $f_n$ of the piston 6 is varied by the gas spring constant $K_g$ in the above Formula 1.

Even if the load is varied, the mechanical spring constant $K_m$ and the mass M of the piston 6 are constant, but the gas spring constant $K_g$ is varied. Thus, the natural frequency $f_n$ of the piston 6 is remarkably influenced by the gas spring constant $K_g$ varied by the load. In the case that the algorithm of varying the natural frequency $f_n$ of the piston 6 by the load is obtained and the operation frequency $f_c$ of the linear motor 10 is synchronized with the natural frequency $f_n$ of the piston 6, efficiency of the linear compressor can be improved and the load can be rapidly overcome.

The load can be measured in various ways. Since the linear compressor is installed in a refrigeration/air conditioning cycle for compressing, condensing, expanding and evaporating refrigerants, the load can be defined as a difference between a condensing pressure which is a pressure of condensing refrigerants and an evaporating pressure which is a pressure of evaporating refrigerants. In order to improve accuracy, the load is determined in consideration of an average pressure of the condensing pressure and the evaporating pressure.

That is, the load is calculated in proportion to the difference between the condensing pressure and the evaporating pressure and the average pressure. The more the load increases, the higher the gas spring constant $K_g$ is. For example, if the difference between the condensing pressure and the evaporating pressure increases, the load increases. Even though the difference between the condensing pressure and the evaporating pressure is not changed, if the average pressure increases, the load increases. The gas spring constant $K_g$ increases according to the load.

Figure 4:
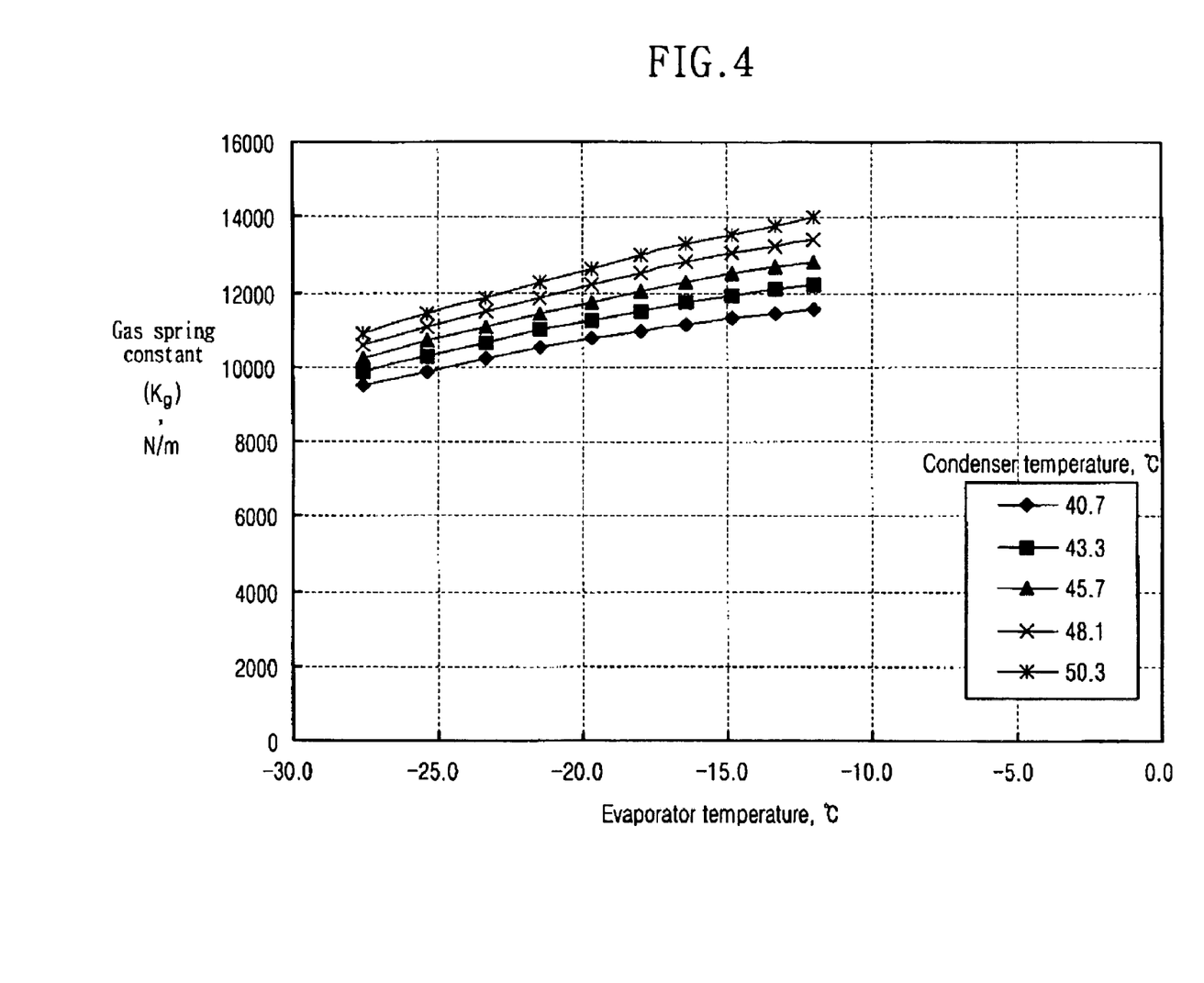
FIG. 4 is a graph showing changes of a gas spring constant by the load in the linear compressor in accordance with the present invention.

As illustrated in FIG. 4, a condensing temperature proportional to the condensing pressure and an evaporating temperature proportional to the evaporating pressure are measured, and the load is calculated in proportion to a difference between the condensing temperature and the evaporating temperature and an average temperature.

The linear motor 10 includes an inner stator 12 formed by stacking a plurality of laminations 12a in the circumferential direction, and fixedly installed outside the cylinder 4 by the frame 18, an outer stator 14 formed by stacking a plurality of laminations 14b at the periphery of a coil wound body 14a in the circumferential direction, and installed outside the cylinder 4 by the frame 18 with a predetermined gap from the inner stator 12, and a permanent magnet 16 positioned at the gap between the inner stator 12 and the outer stator 14, and connected to the piston 6 by the connection member 17. Here, the coil wound body 14a can be fixedly installed outside the inner stator 12.

In the linear motor 10, when a current is applied to the coil wound body 14a to generate an electromagnetic force, the permanent magnet 16 is linearly reciprocated by interactions between the electromagnetic force and the permanent magnet 16, and the piston 6 connected to the permanent magnet 16 is linearly reciprocated inside the cylinder 4.

Figure 5:
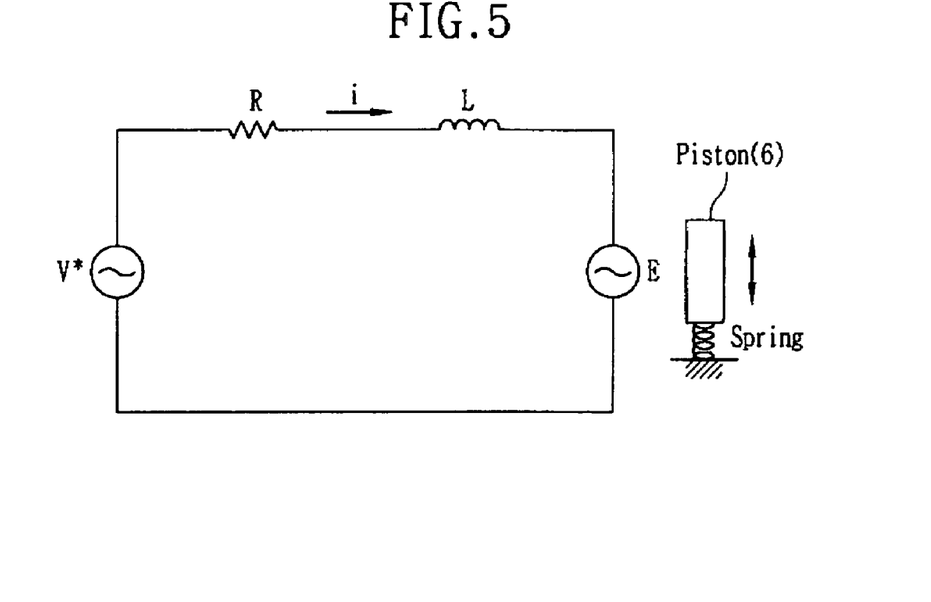
FIG. 5 is an equivalent circuit view illustrating a linear motor embodied as an R-L circuit having a counter electromotive force.

FIG. 5 is an equivalent circuit view illustrating the linear motor embodied as an R-L circuit having a counter electromotive force. In FIG. 5, the theoretical basis of the motion of the piston 6 is explained by a nonlinear simultaneous differential equation such as the following Formula 2. Formula 2 is an electrical equivalent equation.

$$E = V^* - Ri - L\frac{di}{dt} \qquad \text{Formula 2}$$

Figure 6:
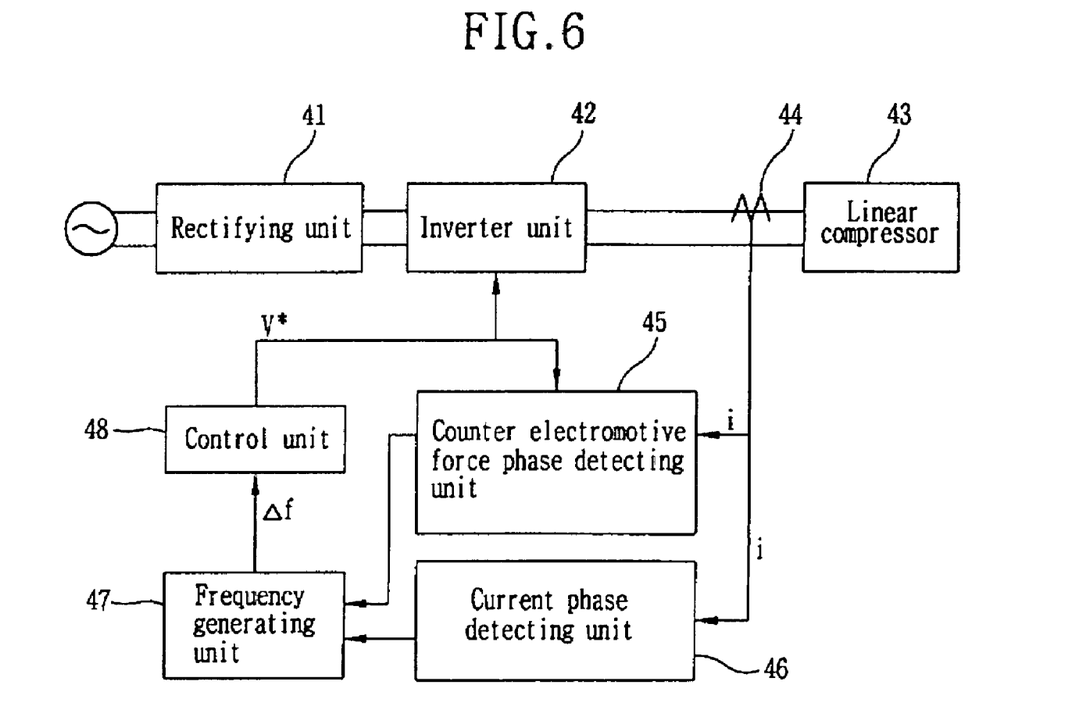
FIG. 6 is a structure view illustrating an apparatus for controlling a linear compressor in accordance with the present invention.

Here, R represents an equivalent resistance, L represents an equivalent inductance coefficient, i represents a current flowing through the motor, and V* represents a voltage command value corresponding to an output voltage from an inverter unit (refer to FIG. 6). The aforementioned variables are all measurable, so that a counter electromotive force can be calculated by Formula 2.

In addition, the theoretical basis of the motion of the piston 6 is explained by a mechanical motion equation such as the following Formula 3.

$$m\frac{d^2 x}{dt^2} + C\frac{dx}{dt} + kx = \alpha i \qquad \text{Formula 3}$$

Here, x represents a displacement of the piston 6, m represents a mass of the piston 6, C represents a damping coefficient, k represents an equivalent spring constant, and α represents a counter electromotive force constant. The mechanical equation obtained by transforming the above Formula 3 into a complex number type is defined as the following Formula 4:

$$E = \frac{\alpha^2}{C + \left(m\omega - \frac{k}{\omega}\right)j} i \qquad \text{Formula 4}$$

Here, ω represents an angular velocity ($\omega = 2\pi \cdot f_c$).

The mechanical resonance occurs when the counter electromotive force and the current are inphase. Therefore, as known from the above Formula 4, in theory, the complex number part of the denominator must be zero. However, as described above, the equivalent spring constant k is obtained by adding up the mechanical spring constant $K_m$ and the gas spring constant $K_g$, and thus varied by the load. It is thus difficult to determine the operation frequency $f_c$ in Formula 4. Therefore, this invention provides the process detecting the resonance frequency (frequency in case of $f_n = f_c$) by varying the operation frequency $f_c$. A control apparatus which synchronizes the operation frequency $f_c$ with the natural frequency $f_n$ by detecting phases of a counter electromotive force and a current and varying the operation frequency $f_c$ according to Formula 3 will be explained.

FIG. 6 is a structure view illustrating the apparatus for controlling the linear compressor in accordance with the present invention.

Referring to FIG. 6, the apparatus for controlling the linear compressor includes a rectifying unit 41 for generating a direct current voltage by rectifying an external alternating current voltage, an inverter unit 42 for receiving the direct current voltage from the rectifying unit 41, generating a sine wave voltage according to a voltage command value V*, and applying the sine wave voltage to the linear compressor 43, the linear compressor 43 for performing compression and suction according to the sine wave voltage from the inverter unit 42, a current sensor 44 for measuring an input current (i) applied to the linear compressor 43, a counter electromotive force phase detecting unit 45 for detecting a phase of the counter electromotive force E from the voltage command value V* and the input current (i), a current phase detecting unit 46 for detecting a phase of the input current (i), a frequency generating unit 47 for comparing the phases of the counter electromotive force E and the input current (i), and generating a frequency change value Δf, and a control unit 48 for correcting the voltage command value V* according to the frequency change value Δf, and applying the corrected value to the inverter unit 42.

In detail, the counter electromotive force phase detecting unit 45 calculates the counter electromotive force E by processing the voltage command value V* and the input current (i) by Formula 2, and detects the phase of the counter electromotive force E.

The frequency generating unit 47 receives the phase of the counter electromotive force E from the counter electromotive force phase detecting unit 45 and the phase of the current (i) from the current phase detecting unit 46, compares the two phases, generates the frequency change value Δf for equalizing the two phases, and transmits the frequency change value Δf to the control unit 48.

The control unit 48 corrects the frequency of the previous voltage command value V* by using the frequency change value Δf from the frequency generating unit 47, and re-applies the corrected voltage command value V* to the inverter unit 42. According to the circulation processing procedure, the control unit 48 applies the voltage command value V* having the frequency (operation frequency $f_c$) resonating with the mechanical natural frequency $f_n$ to the inverter unit 42, so that the linear compressor 43 can perform the resonance operation.

Here, the control unit 48 transforms the voltage command value V* into an inverter control signal (for example, PWM signal), and transmits the signal to the inverter unit 42.

As discussed earlier, in accordance with the present invention, the apparatus and method for controlling the linear compressor achieve the resonance state by using the variables (R, L, i, V*) measurable in the electrical model, instead of estimating the natural frequency $f_n$ by accurately calculating the spring constant K that is a mechanical variable. Therefore, the linear compressor is not sensitive to structural precision during the production. As a result, the apparatus and method for controlling the linear compressor easily overcome structural errors during the process for fabricating the linear compressor, and enable the linear compressor to perform compression and suction in the resonance state.

The linear compressor in which the moving magnet type linear motor is operated and the piston connected to the linear motor is linearly reciprocated inside the cylinder to suck, compress and discharge the refrigerants has been explained in detail on the basis of the preferred embodiments and accompanying drawings. However, although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. An apparatus for controlling a linear compressor, comprising:
    a counter electromotive force phase detecting unit for detecting a phase of a counter electromotive force E from a voltage command value V* of the linear compressor, an input current i and electrical variables;
    a current phase detecting unit for detecting a phase of the input current i;
    a frequency generating unit for comparing the phase of the counter electromotive force E with the phase of the input current i, and generating a frequency change value;
    a control unit for correcting the voltage command value V* according to the frequency change value; and
    an inverter unit for receiving a direct current voltage, generating a sine wave voltage according to the corrected voltage command value V*, and applying the sine wave voltage to the linear compressor.

2. The apparatus of claim 1, wherein the counter electromotive force phase detecting unit detects the phase by operating the counter electromotive force E by the following Formula:

$$E = V^* - Ri - L\frac{di}{dt}$$

(R: winding resistance, L: inductance).

3. The apparatus of claim 1, wherein the frequency generating unit generates the frequency change value so that the phase of the counter electromotive force E and the phase of the input current i can be inphase.

4. The apparatus of claim 1, wherein the control unit transmits the corrected voltage command value V* to the inverter unit in the form of a predetermined inverter control signal.

5. A method for controlling a linear compressor, comprising the steps of:
    detecting a phase of a counter electromotive force E from a voltage command value V* of the linear compressor, an input current i and electrical variables;
    detecting a phase of the input current i;
    comparing the phase of the counter electromotive force E with the phase of the input current i, and generating a frequency change value;
    correcting the voltage command value V* according to the frequency change value; and
    receiving a direct current voltage, and generating a sine wave voltage according to the corrected voltage command value V*.

6. The method of claim 5, wherein the step for detecting the phase of the counter electromotive force detects the phase by operating the counter electromotive force E by the following Formula:

$$E = V^* - Ri - L\frac{di}{dt}$$

(R: winding resistance, L: inductance).

7. The method of claim 5, wherein the step for generating the frequency change value generates the frequency change value so that the phase of the counter electromotive force E and the phase of the input current i can be inphase.

8. The method of claim 5, further comprising a step for transforming the corrected voltage command value V* into a predetermined inverter control signal.

* * * * *